United States Patent
Jaynes

(10) Patent No.: US 6,633,276 B1
(45) Date of Patent: Oct. 14, 2003

(54) ADJUSTABLE VIEWING ANGLE FLAT PANEL DISPLAY UNIT AND METHOD OF IMPLEMENTING SAME

(75) Inventor: Paul Brian Jaynes, San Diego, CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/457,380

(22) Filed: Dec. 9, 1999

(51) Int. Cl.[7] .................................................. G09G 5/08
(52) U.S. Cl. ....................... 345/158; 345/905; 345/110; 348/794; 348/825; 361/681; 248/923
(58) Field of Search ................................ 345/157, 158, 345/902, 905, 161; 361/680, 681, 683; 248/923, 371, 918; 16/342; 353/30; 211/133.2; 312/194; 348/14.5, 790, 794

(56) References Cited

U.S. PATENT DOCUMENTS

| 4,832,419 | A | * | 5/1989 | Mitchell et al. ............ 248/918 |
| 5,170,427 | A | * | 12/1992 | Guichard et al. ......... 348/14.05 |
| 5,537,290 | A | * | 7/1996 | Brown et al. ................ 361/681 |
| 5,771,152 | A | * | 6/1998 | Crompton et al. ........... 248/923 |
| 5,867,148 | A | * | 2/1999 | Kamimaki et al. .......... 345/169 |
| 6,061,104 | A | * | 5/2000 | Evanicky et al. ......... 248/274.1 |
| 6,131,874 | A | * | 10/2000 | Vance et al. ................. 248/550 |
| 6,134,103 | A | * | 10/2000 | Ghanma ..................... 361/681 |
| 6,216,989 | B1 | * | 4/2001 | Shioya et al. ............. 248/122.1 |

* cited by examiner

*Primary Examiner*—Richard Hjerpe
*Assistant Examiner*—Francis Nguyen
(74) *Attorney, Agent, or Firm*—Rader, Fishman & Grauer PLLC; Ronald P. Kananen

(57) ABSTRACT

A flat panel display unit can be adjusted with respect to the bezel in which it is mounted so as to provide an optimal viewing angle from wherever the user chooses to locate himself or herself. Four servos located behind the flat panel display unit shift the angle of the display unit with respect to a bezel in which the display unit is supported and moveably mounted. A remote control unit controls the servo system.

20 Claims, 4 Drawing Sheets

ADJUSTABLE VIEWING ANGLE FLAT PANEL DISPLAY UNIT AND METHOD OF IMPLEMENTING SAME

FIELD OF THE INVENTION

The present invention relates to the field of flat panel display devices such as liquid crystal displays and plasma display devices. More specifically, the present invention relates to a flat panel display unit with a system for adjusting the viewing angle of the flat panel display device.

BACKGROUND OF THE INVENTION

The majority of television sets and computer monitors currently incorporate a cathode ray tube. While the cathode ray tube can provide excellent definition and high picture quality, it has the drawback of being both heavy and bulky. The cathode ray tube is typically formed of a large glass tube that extends backward into a narrow neck at a substantial depth behind the relatively flat picture surface.

This configuration requires television sets and computer monitors using a cathode ray tube to be virtually as deep as they are wide. The housing of a television set or computer monitor must accommodate the shape and size of the cathode ray tube.

In some applications, the size of a cathode ray tube display renders the device completely impractical. For example, the display on a portable laptop computer cannot practically incorporate a cathode ray tube. For such applications, flat panel display devices have been developed. For example, most laptop computers incorporate a liquid crystal display device. The liquid crystal display had the benefit of being light-weight and flat.

The quality of the image on a liquid crystal display has historically been generally inferior to images produced on a cathode ray tube. However, advances in liquid crystal display technology have been closing this gap.

Another flat panel display device is the plasma display device. The plasma display device operates on entirely different principles than the liquid crystal display, but, like the liquid crystal display, can be made relatively flat while still providing adequate picture quality.

As flat panel display devices evolve and the picture quality available improves, flat panel display devices will most likely replace cathode ray tubes in virtually all applications. In particular, television sets, which now generally require a television stand or entertainment center on which to rest, can be replaced by a flat panel unit that hangs on the user's wall without taking up space in the room.

The viewing angle of flat panel display devices, however, presents an obstacle to this trend. A common problem with flat panel display devices is that they provide only a limited range of angles from which the image displayed can be viewed with optimal quality. Generally, the display must be viewed at an angle within 30° to 45° from a direct line of sight, i.e., from a line perpendicular to and passing through the center of the flat panel display.

As a viewer moves beyond this limited range, the displayed image appears to degrade and loose quality. In laptop computers, the liquid crystal display device must typically be angled selectively by the viewer to provide optimal viewing of the displayed image. However, this solution to the problem is not readily available as flat panel display devices evolve into larger, wall-mounted units. For example, if the viewer adjusts a wall-mounted flat panel display to be optimally viewed from a particular location, for example the viewer's sofa, a viewer cannot then sit on the floor, move to a nearby table, etc., and still view a high quality image on the flat panel display.

Consequently, there is a need in the art to overcome this inherent problem with the use of flat panel display devices. More specifically, there is a need in the art for an apparatus and method with which a viewer can optimally adjust the viewing angle of a flat panel display unit.

SUMMARY OF THE INVENTION

It is an object of the present invention to meet the above-described needs and others. Specifically, it is an object of the present invention to provide an apparatus and method with which a viewer can optimally adjust the viewing angle of a flat panel display unit, particularly a flat panel display unit which has been mounted on a wall.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a flat panel display unit with an adjustable viewing angle. The flat panel display unit of the present invention may include a flat panel display device moveably mounted in a bezel, and at least one servo device for adjusting the angle of the flat panel display device with respect to the bezel.

The servo system may include two servo devices connected to different halves of the rear portion of the flat panel display device. Alternatively, the servo system may include four servo devices connected to different quadrants of the rear portion of the flat panel display device.

Preferably, the servo devices are controlled by a remote control device that wirelessly communicates with the flat panel display unit. The remote control unit includes a user input device with which a user can control the servo devices of the display unit and, therefore, the viewing angle of the display unit. Preferably, the user input device is a joystick for controlling the servo devices.

Preferably, each of the servo devices includes an extension member that selectively extends and retracts to adjust the angle of the flat panel display device with respect to the bezel. A driver is used to selectively extend and retract the extension member. A pivot joint is used to connect the extension member to the rear portion of the flat panel display device. The joint allows the flat panel display device to tilt with respect to the extension member.

The present invention also encompasses the method of implementing the flat panel display device described above. Particularly, the present invention encompasses a method of operating a flat panel display unit by selectively adjusting an angle of the flat panel display device with respect to the bezel in which the flat panel display device is moveably mounted using at least one servo device.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
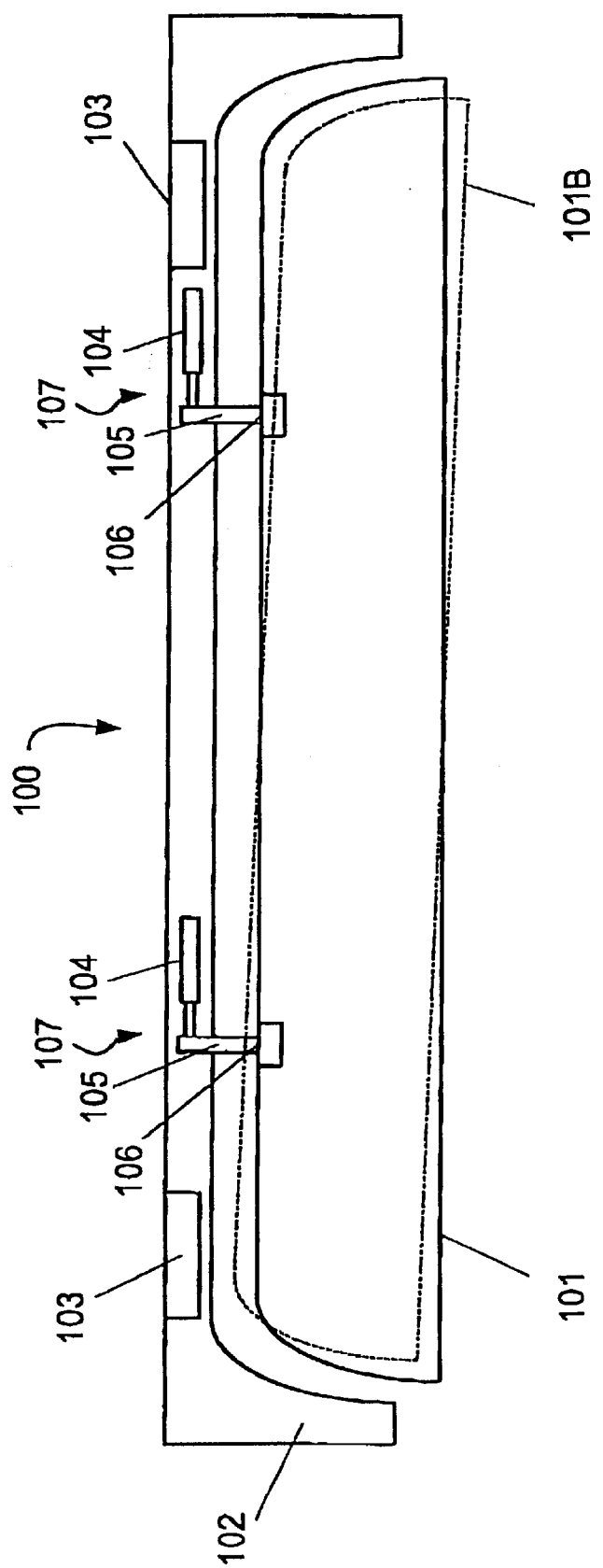
FIG. 1 is a plan view of an adjustable angle flat panel display device according to the present invention.

FIG. 1 illustrates a top or plan view of an adjustable angle, flat panel display unit according to the present invention. The flat panel display unit (100) is comprised of two main elements, the actual flat panel display device (101) and a housing or bezel (102) in which the display device (101) is mounted.

The flat panel display device illustrated in FIG. 1 is intended as a wall-mounted display device. Consequently, the bezel (102) may be provided with mounting devices (103) on the rear surface thereof for mounting the display unit (100) to a user's wall. The mounting devices (103) can be any of a number of equivalent devices known for mounting an object to a wall or other structure.

In order to address the problem of a limited viewing angle for the flat panel display device (101), the flat panel display device (101) is moveably mounted and supported within the bezel (102). Specifically, in addition to any supporting attachments, the flat panel display device (101) is connected to the bezel (102) by a plurality of servo devices (107).

The servo devices (107) are used to adjust the angle of the flat panel display device (101) within the bezel (102). Consequently, even though the bezel (102) is mounted in an optimal position and orientation for viewing the flat panel display device (101) from a particular location, a viewer can move to another location and can correspondingly tilt or angle the flat panel display device (101) within the bezel (102) using the servos (107) to bring the new viewing location within the optimal viewing angle of the flat panel display device (101).

Each servo device (107) includes a servo driver (104), an extension or shaft (105) and a joint (106). The servo driver (104) causes the extension or shaft (105) to extend or retract so as to shift the tilt or angle of the flat panel display device (101).

The joint (106) connects the extension or shaft (105) to the rear of the display device (101). The joint (106) allows the display device (101) to pivot with respect to the extension (105), while still remaining connected to the extension (105). Thus, as the shafts (105) of the various servo devices (107) extend and retract, the joints (106) allow the display device (101) to tilt to the angle desired by the viewer for optimal image quality. A tilted orientation for the display device (101) with respect to the bezel (102) is shown in ghost (101B) in FIG. 1.

The servo devices (107) can be any of a variety of different devices capable of selectively extending and retracting a member, such as the extension (105), that is connected to the rear of the flat panel display device (101). For example, the servo devices (107) may include a stepper motor as the servo driver (104) which drives the shaft (105) to extend and retract. Alternatively, the shaft (105) may comprise a screw that is rotated by the servo driver (104) to selectively extend and retract. In another alternative, the shaft (105) may comprise piezoelectric elements, while the servo driver (104) electrically drives those elements to expand and contract. The servo (107) could also be a hydraulic system.

Any servo system that can expand and contract selectively so as to angle the flat panel device (101) could potentially be used in the present invention. However, some system will have inherent advantages over others in such factors as complexity, cost and reliability.

Figure 2:
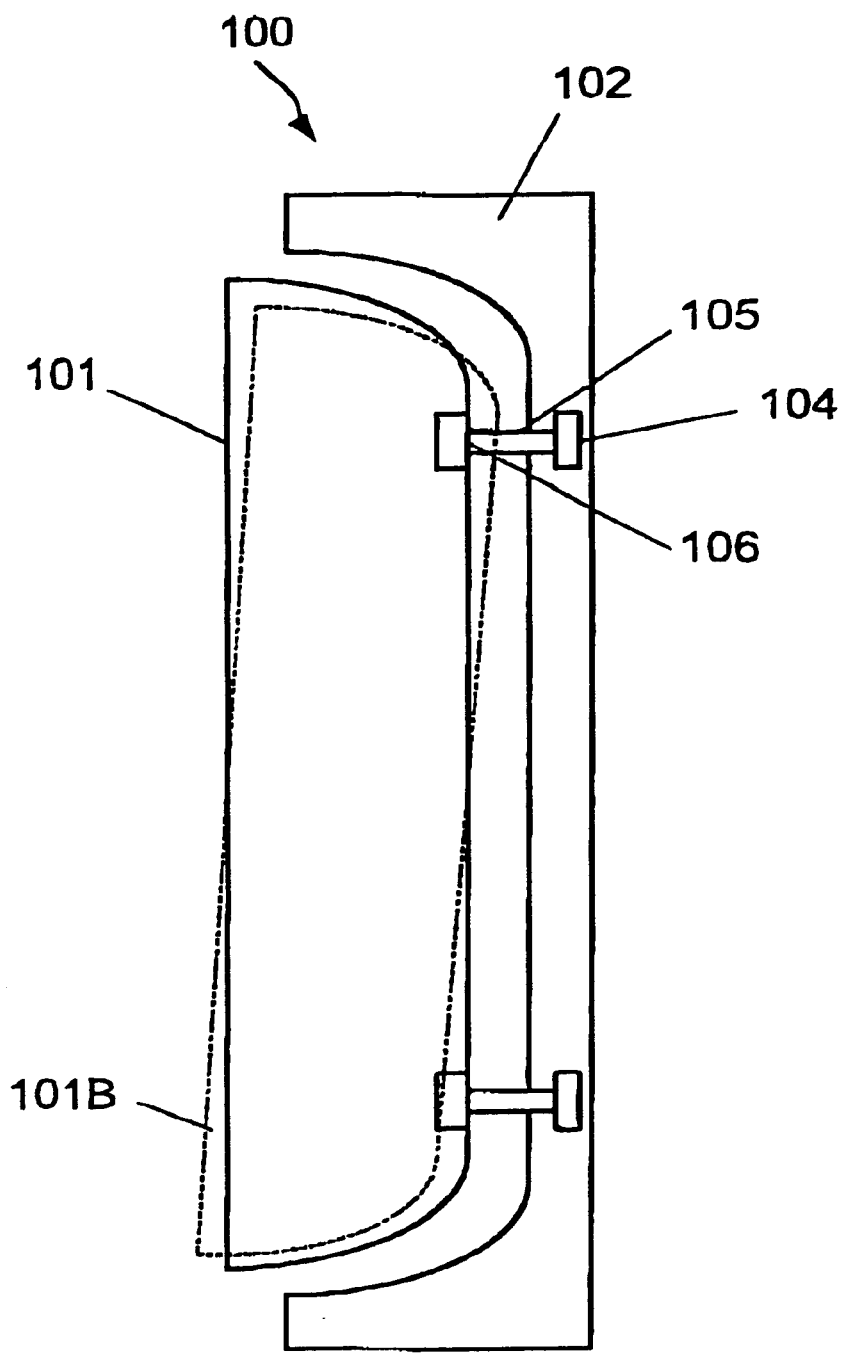
FIG. 2 is a side view of the flat panel display device of the present invention and as shown in FIG. 1.

FIG. 2 illustrates a side view of the flat panel display unit (100) of the present invention. Like elements are denominated with identical reference numbers. The flat panel device (101), assuming a tilted orientation, is shown in ghost (101B) in FIG. 2. As shown in FIGS. 1 and 2, the servos (107) are preferably distributed so as to allow the flat panel display device (101) to tilt with respect to both a vertical axis (FIG. 1) and a horizontal axis (FIG. 2). By combining the tilt of the flat panel display device (101) along these two axes, the flat panel display device (101) can be made to adopt a wide variety of angles to suit the needs of users.

Figure 3:
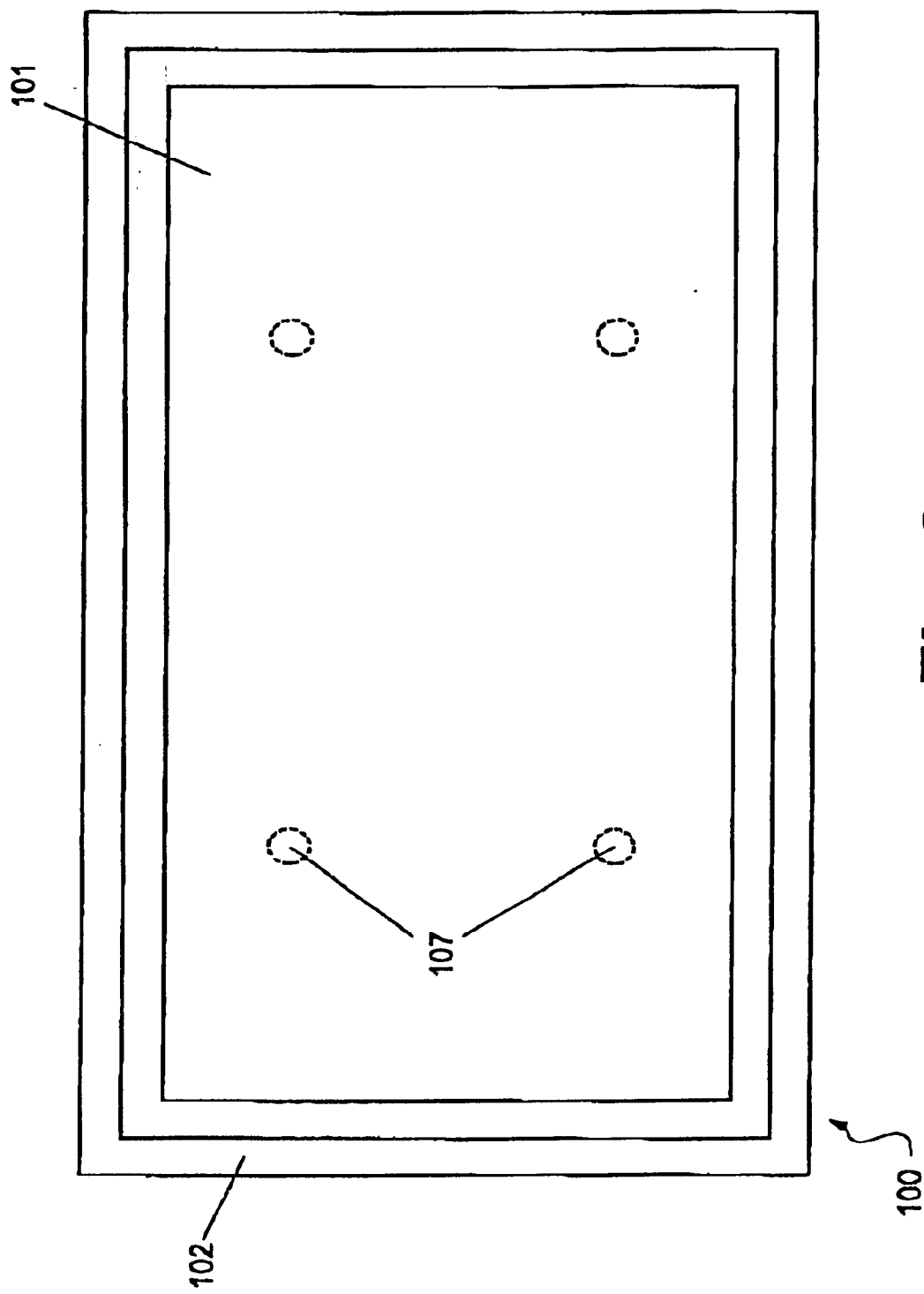
FIG. 3 is a front view of the flat panel display device of the present invention and as shown in FIG. 1.

FIG. 3 illustrates a front view of the flat panel display unit (100) of the present invention, with the flat panel display device (101) housed in the bezel (102) as described above. FIG. 3 also illustrates a preferred distribution and number of servo units (107) for practicing the present invention.

The location of four servo units (107) is shown in ghost in FIG. 3. Preferably, the flat panel display device (101) is divided into four quadrants with a servo unit (107) being connected to the rear side of the flat panel display device (101) at approximately the center of each of the four quadrants. This configuration allows the flat panel display device (101) to be tilted at an angle with respect to the bezel (102) along both a horizontal axis and a vertical axis.

Figure 4:
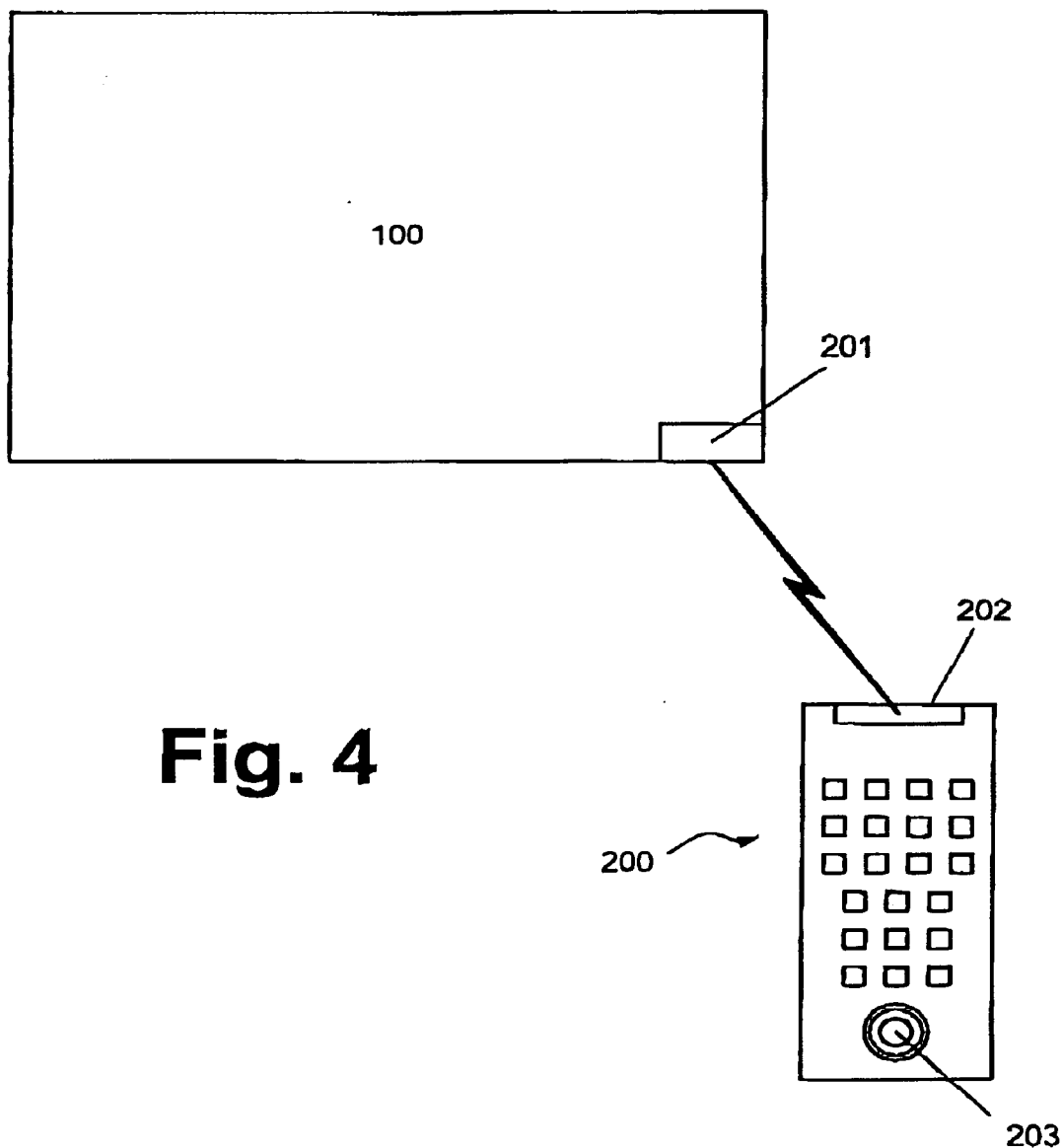
FIG. 4 is an illustration of a remote control unit for use with the flat panel display device of the present invention.

FIG. 4 illustrates the preferred system for controlling the viewing angle of the flat panel display device of the present invention. As shown in FIG. 4, a remote control unit (200) can be used to operate the flat panel display unit (100) of the present invention.

Preferably, the remote control unit (200) incorporates a wireless transmitter (202) that wirelessly signals a receiver (201) incorporated in the flat panel display unit (100). The wireless transmitter (202) may be, for example, an optical or radio frequency signal transmitter. An infrared optical transmitter is preferred.

Using the remote control unit (200), the user can send control signals to the flat panel display unit (100) to, for example, adjust the picture of the unit (100). If the flat panel display unit (100) is being used as a television set, the remote control unit (200) may allow the user to, for example, control the volume of the audio from the set or change the channel being tuned by the set.

The remote control unit (200) of the present invention also includes a user input device for controlling the servo devices (107). Consequently, the user can operate the user input device on the remote control unit (200) to cause the flat panel display device (101) to tilt with respect to either a vertical or horizontal axis within the bezel (102). This allows the user to remotely adjust the viewing angle of the flat panel display device (101) to accommodate his or her position with respect to the flat panel display unit (100).

The user input device for controlling the flat panel display device (101) may take several forms. For example, the user input device may incorporate a dial, a knob, a trackball, a touch-pad or an arrangement of buttons indicating the different directions in which the device (101) can be tilted.

In a preferred embodiment, the user input device for controlling the flat panel display device (101) is a joystick (203). The joystick (203) can readily and intuitively be deflected by the user from a biased upright position with respect to the remote control unit (200), to indicate the direction in which the user wishes the flat panel display device (101) to tilt. In the preferred embodiment, by deflecting the joystick (203) at an angle between two cardinal directions, the user can simultaneously tilt the flat panel display device (101) along both a horizontal axis and a vertical axis to most rapidly achieve a desired orientation.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A flat panel display unit comprising:
   a flat panel display device moveably mounted in a bezel; and
   at least two servo devices connected to different halves of a rear portion of said flat panel display device for adjusting an angle of said flat panel display device with respect to said bezel.

2. The unit of claim 1, wherein said at least two servo devices further comprises four servo devices connected to different quadrants of a rear portion of said flat panel display device.

3. The unit of claim 2, wherein said at least two servo devices are controlled by a remote control device that wirelessly communicates with said flat panel display.

4. The unit of claim 3, wherein said remote control unit further comprises a joystick for controlling said at least two servo devices.

5. The unit of claim 1, wherein said at least two servo devices are controlled by a remote control device that wirelessly communicates with said flat panel display unit.

6. The unit of claim 5, wherein said remote control device further comprises a joystick for controlling said at least two servo devices.

7. The unit of claim 1, wherein each of said at least two servo devices comprises:
   an extension member that selectively extends and retracts to adjust said angle of said flat panel display device with respect to said bezel;
   a driver for selectively extending and retracting said extension member; and
   a joint connecting said extension member to a rear portion of said flat panel display device allowing said flat panel display device to tilt with respect to said extension member.

8. The unit of claim 1, wherein said at least two servo devices further comprises three servo devices connected to a rear portion of said flat panel display device.

9. A method of operating a flat panel display unit comprising selectively adjusting an angle of said flat panel display device with respect to either a horizontal axis or vertical axis of a bezel in which said flat panel display device is moveably mounted using at least two servo devices connected to different halves of a rear portion of said flat panel display device.

10. The method of claim 9, further comprising adjusting said angle with respect to both a horizontal axis and a vertical axis using four servo devices connected to different quadrants of a rear portion of said flat panel display device.

11. The method of claim 10, further comprising controlling said at least two servo devices with a remote control device that wirelessly communicates with said flat panel display unit.

12. The method of claim 11, wherein said controlling said at least two servo devices further comprises operating a joystick on said remote control unit for controlling said at least two servo devices.

13. The method of claim 9, further comprising controlling said at least two servo devices with a remote control device that wirelessly communicates with said flat panel display unit.

14. The method of claim 13, wherein said controlling said at least two servo devices further comprises operating a joystick on said remote control unit for controlling said at least two servo devices.

15. The method of claim 9, wherein said adjusting said angle of said flat panel display device is performed by selectively extending and retracting an extension member of each of said at least two servo devices.

16. A flat panel display unit comprising:
   a flat panel display device moveably mounted in a housing means for housing said flat panel display device; and
   at least two servo devices connected to different halves of a rear portion of said flat panel display device for adjusting an angle of said flat panel display device with respect to said housing means.

17. The unit of claim 16, wherein said at least two servo devices further comprises four servo devices connected to different quadrants of a rear portion of said flat panel display device.

18. The unit of claim 16, wherein said at least two servo devices is controlled by a user input means on a remote control unit that wirelessly communicates with said flat panel display unit.

19. The unit of claim 18, wherein said user input means comprise a joystick for controlling said at least two servo devices.

20. The unit of claim 16, wherein each of said at least two servo devices comprises:
   extension means for selectively extending and retracting to adjust said angle of said flat panel display device with respect to said housing means;
   driving means for selectively extending and retracting said extension means; and
   joint means for connecting said extension means to a rear portion of said flat panel display device while allowing said flat panel display device to tilt with respect to said extension means.

* * * * *